(12) United States Patent
Arzelier

(10) Patent No.: US 12,101,430 B2
(45) Date of Patent: Sep. 24, 2024

(54) METHOD AND SYSTEM FOR CHARACTER DISPLAY IN A USER EQUIPMENT

(71) Applicant: BlackBerry Limited, Waterloo (CA)

(72) Inventor: Claude Jean-Frederic Arzelier, Molieres-sur-Ceze (FR)

(73) Assignee: BlackBerry Limited, Waterloo (CA)

( * ) Notice: Subject to any disclaimer, the term of this patent is extended or adjusted under 35 U.S.C. 154(b) by 310 days.

(21) Appl. No.: 17/765,699

(22) PCT Filed: Oct. 12, 2020

(86) PCT No.: PCT/EP2020/078537
§ 371 (c)(1),
(2) Date: Mar. 31, 2022

(87) PCT Pub. No.: WO2021/078549
PCT Pub. Date: Apr. 29, 2021

(65) Prior Publication Data
US 2022/0377168 A1    Nov. 24, 2022

Related U.S. Application Data

(60) Provisional application No. 62/925,528, filed on Oct. 24, 2019.

(51) Int. Cl.
*H04M 1/72463*   (2021.01)
*H04W 8/02*      (2009.01)
(Continued)

(52) U.S. Cl.
CPC ......... *H04M 1/72463* (2021.01); *H04W 8/02* (2013.01); *H04W 8/26* (2013.01); *H04M 2250/58* (2013.01); *H04W 84/042* (2013.01)

(58) Field of Classification Search
None
See application file for complete search history.

(56) References Cited

U.S. PATENT DOCUMENTS 7,039,172 B2 *  5/2006  Wrobel ............... H04M 3/42
                                                  379/142.04
7,120,573 B2 * 10/2006  Honeywood ......... H04L 51/10
                                                      704/8
(Continued)

FOREIGN PATENT DOCUMENTS

CN    1496180 A    5/2004
CN  102934418 A    2/2013
(Continued)

OTHER PUBLICATIONS

Patent Cooperation Treaty, International Search Report for International application No. PCT/EP2020/078537 mailed Jan. 21, 2021.
(Continued)

*Primary Examiner* — Kenneth B Wells
(74) *Attorney, Agent, or Firm* — Moffat & Co

(57) ABSTRACT

A method at a user equipment, the method including receiving a string of indicia identifying at the user equipment, the string further comprising an indicator bit; based on the indicator bit, performing one of: determining whether the user equipment supports one or more indicium of the string of indicia and skipping display of characters corresponding to non-supported indicia; or displaying all indicium within the string of indicia. In other embodiments, utilizing a language delineator to choose a string of indicia to display or providing a language delineator to a network element and using the complete string of indicia received from a network element based on the provided language delineator.

21 Claims, 8 Drawing Sheets

(51) Int. Cl.
*H04W 8/26* (2009.01)
*H04W 84/04* (2009.01)

(56) References Cited

U.S. PATENT DOCUMENTS

| | | |
|---|---|---|
| 8,515,422 B2 | 8/2013 | Arzelier |
| 9,002,699 B2* | 4/2015 | Qin ..................... G06F 3/0484 |
| | | 704/8 |
| 9,026,087 B2 | 5/2015 | Arzelier |
| 9,049,557 B2* | 6/2015 | Yu ..................... H04M 1/72457 |
| 2004/0054745 A1 | 3/2004 | Lee |
| 2006/0046751 A1 | 3/2006 | Le |

FOREIGN PATENT DOCUMENTS

| | | |
|---|---|---|
| CN | 103270743 A | 8/2013 |
| JP | 08122132 A | 5/1996 |
| KR | 20160123738 A | 10/2016 |
| WO | WO2014022306 A2 | 2/2014 |

OTHER PUBLICATIONS

3GPP TS 24.008 version 16.1.0, Technical Specification Group Core Network and Terminals, Mobile radio interface Layer 3 specification; Core network protocols; Stage 3, Jun. 14, 2019.

3GPP TS 22.101 version 16.2.0, "Technical Specification Group Services and System Aspects, Service aspects, Service principles", Jun. 14, 2019.

3GPP TS 24.501 version 16.1.0, Technical Specification Group Core Network and Terminals; Non-Access-Stratum (NAS) protocol for 5G System (5GS); Stage 3, Jun. 14, 2019.

3GPP TS 24.301 version 16.1.1, Technical Specification Group Core Network and Terminals; Non-Access-Stratum (NAS) protocol for Evolved Packet System (EPS); Stage 3, Jun. 21, 2019.

Office Action, Chinese Application No. 2020080074384.5, issued Dec. 21, 2023.

Change Request, 3GPP TS 22.101 CR 0557, 3GPP TSG SA Meeting #84, Newport Beach, USA, Jun. 2019.

\* cited by examiner

| 8 | 7 | 6 | 5 | 4 | 3 | 2 | 1 | |
|---|---|---|---|---|---|---|---|---|
| Network Name 2 IEI ||||||||  octet 1 |
| Length of Network Name 2 contents |||||||| octet 2 |
| Coding scheme ||| Number of Additional Languages || spare 0  0  0 ||| octet 3 |
| Number of octets of language 1 ||||| Number of spare bits in last octet of language 1 ||| octet 4 |
| Language 1 discriminator |||||||| octet 5 |
| Text String of language 1 |||||||| octet 6 ... octet 6+a |
| Number of octets of language 2 ||||| Number of spare bits in last octet of language 2 ||| octet 7+a |
| Language 2 discriminator |||||||| octet 8+a |
| Text String of language 2 |||||||| octet 9+a ... octet 9+a+b |
| Number of octets of language 3 ||||| Number of spare bits in last octet of language 3 ||| octet 10+a+b |
| Language 3 discriminator |||||||| octet 11+a+b |
| Text String of language 3 |||||||| octet 12+a+b ... octet 12+a+b+c |
| Number of octets of language 4 ||||| Number of spare bits in last octet of language 4 ||| octet 13+a+b+c |
| Language 4 discriminator |||||||| octet 14+a+b+c |
| Text String of language 4 |||||||| octet 15+a+b+c ... octet n |

FIG. 6

METHOD AND SYSTEM FOR CHARACTER DISPLAY IN A USER EQUIPMENT

FIELD OF THE DISCLOSURE

The present disclosure relates to displaying characters on a user equipment (UE), and in one embodiment relates to displaying characters related to a network that the user equipment is connected to.

BACKGROUND

A user equipment generally displays to the user the name of the network operator, also known as the "carrier", corresponding to the cell that the user is camped on. This allows the user to know the name of the carrier that it will use, should the user wish to make a call or use data.

Specifically, when a UE connects to a Public Land Mobile Network (PLMN), the PLMN typically provides network name information to the UE. The UE then usually displays the name of the network where the UE is camped on a display screen. This could be in idle mode or connected mode. One way in which the network name information can be provided to the UE is known as a Network Identity and Time Zone (NITZ) feature, in which the network sends via text string coding for the network name. The coding may be performed according to a Global System for Mobile Communications (GSM) default alphabet or according to the International Organization for Standardization/International Electrotechnical Commission (ISO/IEC) Standard 10646, which specifies a Universal Character Set (UCS).

A problem may arise when a user using a first language in one country roams to another country in which another language is used. The local/visited PLMN can provide a network name to the device in a message for the UE to display. However, if the language that the user uses as set on the device is different than the language of the visited PLMN then the phone may display a network name to the user in a language that the user would not understand or may attempt to display a network name corresponding to some characters not supported on the UE.

BRIEF DESCRIPTION OF THE DRAWINGS

The present disclosure will be better understood with reference to the drawings, in which:

FIG. 6 is a block diagram showing an example information element having a plurality of signaling fields with language discriminators;

DETAILED DESCRIPTION

Figure 1:
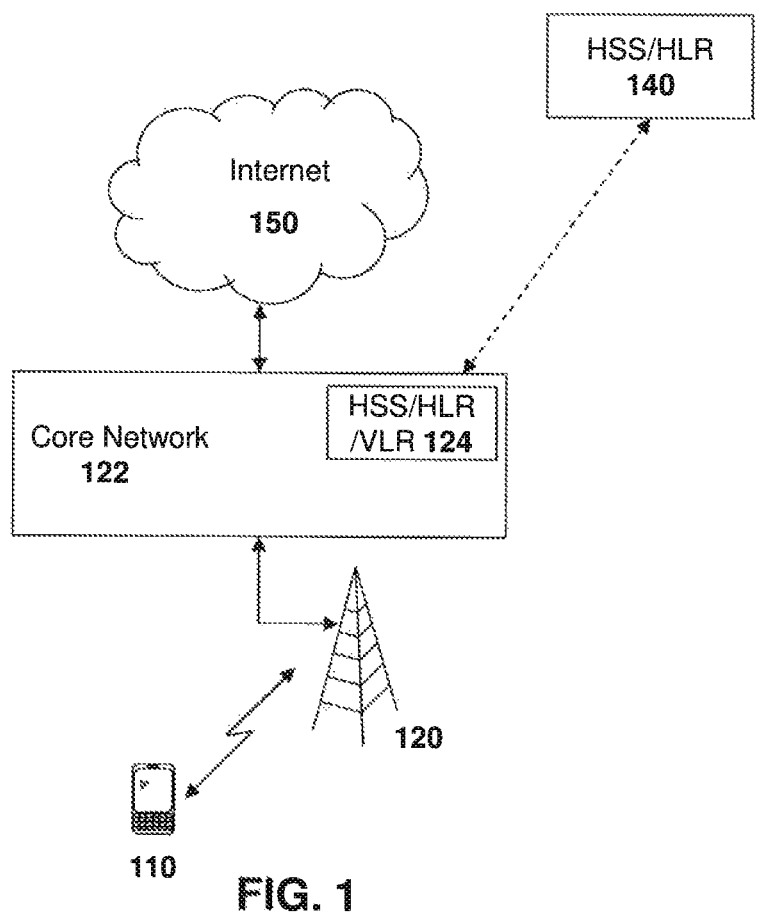
FIG. 1 is a block diagram of an example network architecture capable of being used with the embodiments described herein.

The present disclosure provides a method at a user equipment, the method including receiving a string of indicia identifying at the user equipment, the string further comprising an indicator bit; based on the indicator bit, performing one of: determining whether the user equipment supports one or more indicium of the string of indicia and skipping display of characters corresponding to non-supported indicia; or displaying all indicium within the string of indicia. In other embodiments, utilizing a language delineator to choose a string of indicia to display or providing a language delineator to a network element and using the complete string of indicia received from a network element based on the provided language delineator.

As used herein, the term "user equipment" or "UE" may mean any mobile equipment, mobile station and may refer to a mobile device such as any mobile telephone, personal digital assistant, handheld or laptop computer, and similar devices that have telecommunications capabilities, all of which may be used interchangeably. Such UE may consist of a device and its associated removable memory module, such as, but not limited to, a Universal Integrated Circuit Card (UICC) that includes a Subscriber Identity Module (SIM) application, a Universal Subscriber Identity Module (USIM) application, or a Removable User Identity Module (R-UIM) application. Alternatively, such UE may consist of the device itself without such a module.

As provided above, a UE may need to display characters such as the network name to a user. In accordance with the Third Generation Partnership Project (3GPP) Technical Specification (TS) 22.101, *"Service aspects; Service principles"*, v. 17.0.0, September 2019, three network name display features are provided. These three display features, from highest to lowest priority, are:

a. The PLMN name stored in the USIM of the device associated with the PLMN identity, including the mobile country code (MCC) and mobile network code (MNC) of the carrier;

b. The PLMN name received in signaling from the network via the NITZ feature; and c. The PLMN name stored in the Mobile Equipment (ME) and associated with the PLMN identity of the carrier.

In this way, a wireless network or radio access network may provide network information to a connected UE using one of the plurality of schemes. The network information may be displayed on the UE to provide the user of such UE with information about the network, such as the network name, the country name, a graphic representing the network, and/or other related information.

Given the three options provided in the 3GPP TS 22.101 Standard, if the UE supports more than one feature for displaying the network information, the UE may use the feature with the highest priority and ignore the remaining features. Typically, USIM information has the highest priority, and therefore obtaining information from the USIM may be attempted first.

The information from the NITZ has the second highest priority and the UE may attempt to use this information if the USIM information is not available.

The ME information has a third priority and thus the UE may attempt to use this information if both of the other two features are not available or supported.

In some cases, for example when using the NITZ feature, the network may send network information to the UE that cannot be displayed properly on the UE. For example, the UE may connect to a wireless network that sends a string of characters to indicate the network name to the UE in a format that is not supported or cannot be properly displayed on the UE. Typically, in such cases, the UE may display the wrong or garbage characters, such as jumbled characters, that do not provide a user of the UE with useful information.

In other cases, when a user is roaming, the information may be displayed to the user in a language that the user does not understand. For example, if a user from North America roams to China, displaying the name of the carrier in Chinese characters may not provide a user with information about the carrier if the user cannot read Chinese characters. Similarly, if a user from China roams to North America, the displaying of Latin characters on the user's device may not provide such Chinese user with sufficient information.

Various attempts have been made to deal with some of the above issues. In U.S. Pat. No. 8,515,422, "Displaying Characters and Images Based On Support", Aug. 20, 2013, the patent deals with skipping un-displayable indicia. In particular, if characters in the network text string would be "garbage" characters, the patent teaches the skipping of these characters when displaying the carrier text string.

In one case, the UE may receive characters in two different languages and does not display or skips the characters that are not in the language set up on the UE. In that case, the solution uses the MMI configured on the UE to choose the language to display. A man-machine interface is the menu that a user uses to control the device to set the language of the device.

Such solution is further adopted into the 3GPP TS 22.101 Specification. In particular, release 10 of that Standard states:

For a PLMN name provided by NITZ, operators using non-Latin characters of the local language (such as Chinese, Japanese, Korean, Vietnamese, Arabic, Hindi, etc.) may include the network name in Latin characters in addition to characters of the local language.

For PLMN name provided by NITZ, the roaming UE should skip displaying non-Latin character(s) if the language for those character(s) does not match the language of the MMI for the UE. If this would lead to no remaining Latin character in the PLMN name, the UE should skip displaying the PLMN name provided by NITZ; the PLMN name stored in the ME has the next priority instead.

The above allows for a user with the UE having an MMI using Latin characters to roam to China and see a network name displayed in Latin characters. The Chinese network operator would include the network name both in Chinese and Latin in those messages sent to the UE, and the UE would skip or not display the Chinese characters, as those characters do not match the language of the MMI which is in English in this case.

A further issue with displaying network names is with regard to character ambiguity. As used herein, the terms "ambiguous", "ambiguity", and the like can refer to a single character code they can be decoded as different characters in different languages. An ambiguous character is a character that is encoded by an ambiguous character code. An unambiguous character code is a character code that represents only one single character with a single code.

Because the GSM default alphabet, as defined in 3GPP TS 23.038, "Alphabets and Language-Specific Information", v. 15.0.0, June 2018, does not allow the coding of some languages, another coding scheme was re-used for NITZ, as defined as the ISO/IEC 10646. While the following discussion focuses on ambiguities that may arise in the ISO/IEC 10646 standard, the present disclosure is not limited to such coding scheme and such coding scheme should therefore be considered only an example and the embodiments described below may be applicable in other circumstances.

While the ISO/IEC 10646 coding scheme does allow for the coding of characters in Asian languages, there are some ambiguities as to which Asian language character is represented by a particular hexadecimal code. In particular, reference is now made to Table 1 below.

TABLE 1

| | Ambiguities in Coded Characters | | | | |
|---|---|---|---|---|---|
| Hexadecimal code | Hanzi-G (Chinese simplified) | Hanzi-T (Chinese traditional) | Kanji (Japanese) | Hanja (Korean) | ChuNom (Vietnamese) |
| 6811 | X | X | | | |
| 6812 | X | X | | X | |
| 688C | X | X | | X | X |
| 689E | X | X | | | X |
| 688F | X | X | X | X | X |
| 6884 | X | X | X | | |
| Other example 1 | X | X | X | X | |
| Other example 3 | | | X | X | X |
| Other example 3 | X | X | X | | X |

In Table 1, a "X" symbol in the table indicates that a hexadecimal code in the corresponding row represents a symbol in the language in the corresponding column. As can be seen in Table 1, hexadecimal code 6811 could represent either a simplified Chinese character or a traditional Chinese character. Similarly, the hexadecimal code 6812 could represent a simplified Chinese character, a traditional Chinese character, or a Korean character.

The hexadecimal code 688C could represent a simplified Chinese character, a traditional Chinese character, a Korean character, or a Vietnamese character. Similar examples exist within the coding set.

Because of these ambiguities, it may not sometimes be possible for the UE to determine the appropriate character that should be used when a network name is provided to the UE, and the UE could display an incorrect character. For example, if a UE receives the hexadecimal code 6812, the UE could display a Chinese character when a Korean character was intended, or vice versa.

The ambiguity of the coded characters are based on the languages: Chinese, Japanese, Korean and Vietnamese ("CJKV"). One solution to this is provided in U.S. Pat. No. 9,026,087, "Solving Character Display Ambiguities", May 5, 2015. This patent teaches resolution based on other information provided by a network such as the Mobile Country Code, Mobile Network Code, Routing Area Identity (RAI) or a Location Area Identity (LAI), among other such information. For example, if MCC information is used, then Table 2 below, which represents Table 10.5.93a of the 3GPP TS 24.008, *"Mobile radio interface Layer 3 specification; Core network protocols; Stage 3"*, v. 16.2.0, September 2019, Standard, shows an MCC to CJKV Ideograph language mapping table. The same table further appears in 3GPP TS 24.301, *"Non-Access-Stratum (NAS) protocol for Evolved Packet System (EPS); Stage 3"*, v. 16.2.0, September 2019, for a Long Term Evolution (LTE) network and 3GPP TS 24.501, *"Non-Access-Stratum (NAS) protocol for 5G System (5GS); Stage 3"*, v. 16.2.0, September 2019, for a Fifth Generation (5G) Core Network.

TABLE 2

MCC to CJKV

| MCC(s) | Country/Region | Language (C, J, K or V) |
|---|---|---|
| 460, 461 | Mainland China | Chinese-G |
| 466 | Taiwan | Chinese-T |
| 454 | Hong Kong | Chinese-T |
| 455 | Macao | Chinese-T |
| 440, 441 | Japan | J (Kanji) |
| 450, 467 | Korea | K (Hanja) |
| 452 | Vietnam | V (Chunom) |

However, even with these solutions, certain issues exist with regard to character display. In particular, the current text in the 3GPP TS 22.101 forces a UE to display a network name in Latin in some cases. For example, a user from Japan roaming to China would have displayed on their UE the network name in Latin characters. Specifically, in this case the Chinese network operator has included the network name in Latin characters and in Chinese. However, the UE roaming from Japan to China would skip the Chinese characters based on current Standards and display the network name in Latin characters that the Japanese user may not understand.

One general solution to this would be to allow a similar, symmetrical functionality to the one previously introduced in 3GPP TS 22.101. As before, the desired outcome is that a roaming UE would display only the characters that correspond to the language type of the MMI. In this differentiation, the distinction would be between Latin language types, which would be considered as one general "language", and every other non-Latin language. By considering Latin languages as one language, a UE roaming from the UK to France would still display the network name in the French language for example. If this leads to no remaining alphabet characters of the MMI language type, then the NITZ string is not used and the ME display feature is used instead. In this case, a UE roaming from China to Japan would skip the Japanese characters but also Latin characters. As there would not be any Japanese characters to display, then the UE would skip using the NITZ string for display and would use the ME display features instead. Such ME display features could include the use of Japanese characters.

From the above, if a UE roams for example from China to the US, the UE would skip the Latin characters. Since there would not be any other alphabet characters to display in the NITZ, the UE would skip the NITZ display characters and would use the ME information to display instead.

One further issue that may arise is with regard to a non-roaming scenario. If a carrier in China sends the name in both Chinese and Latin, a home user from this carrier would display the network name to the local user in Chinese and Latin, because the skipping solution that is currently part of the 3GPP TS 22.101 standards does not apply to non-roaming cases. One solution to this would be to extend skipping characters to a non-roaming UE. In this way, the Chinese home user would only see Chinese characters displayed for her home carrier. This would also cater to the case of the user in a country who has set up the language of the phone in another language because the user's native tongue is different from the country where the such user lives.

However, skipping characters may lead to problems even if such characters do not form part of the native language character set. For example, in South Korea, the name of one carrier is "SK Telecom". This is written Korean as "SK 텔레콤". The name includes the letters "SK" which has no translation in Korean characters. A carrier using the hybrid Latin/non-Latin characters like SK telecom could send the network name, such as "SK 텔레콤 Telecom", followed by "SK Telecom" in Chinese. A UE roaming from a Latin country would correctly display "SK Telecom". A UE roaming from China would skip the Latin and Korean characters and correctly display the network name in Chinese. However, a local Korean UE, if the skipping idea was extended to non-roaming UEs, would display "텔레콤" because it would skip the characters "SK" as they are considered Latin. This would look a bit strange to a local user.

The same issue arises for UE roaming into Korea that has their language set to Korean. Even if the downlink information from a network includes fields or information elements (IEs) of the language indicator, then the above still applies.

In particular, the UE would skip alphabet characters considered to be part of a different language instead of the field if the character coding allows to code a language for each character. If the UE detects that some characters in the received field are from a character different than language of the MMI of the UE then the UE may incorrectly believe that a behavior related to the language of those characters apply.

For example, the UE with a Korean MMI may incorrectly skip the characters "SK" that are coded in Latin characters inside of the field. ISO/IEC 10646 coding is done in such a way that generally each character is coded separately with its associated language. Using the code of the character or the range of the code of the character, the UE can assess that the character is in fact Latin for example. The example of the SK Telecom issue above highlights the fact that generally solutions are needed that would solve mixed-language requirements.

Further, even if the "skipping characters" solution is removed from the 3GPP standards, additional solutions may still be required in order to solve the issues described above. This is because a user equipment may be using a language different than the carrier, either in the home network or while roaming, and would see the network name displayed in language that a user of such a device may not understand.

Further, the solutions described above work well with the assumption that what is indicated or displayed is the local name of the network. In other words, it is the home name in the local language understood by the user. However, in cases of user roaming, or the language of the user being different than language of the local carrier, then new issues arise which may require different solutions.

Further, in some cases, a UE may indicate to the network a language preference which in turn would lead to the NITZ message being sent in the language of the MMI for the UE to display. However, there is no definition in this case of the interactional priorities putting this feature and the other three features described above with regard to displaying a network name, and also possibly taking into account whether the UE is roaming or not.

In addition, the interaction between providing language preferences and the solution to CJKV ambiguity is currently not defined.

Further, one other issue is that with some network names either Latin or non-Latin, these names could include some special characters including a space " ", a dash "-" or an ampersand "&". The special characters are actually not considered as Latin characters pursuant to the ISO 10646 coding. Therefore, if the carrier indicates for example "AT&T", then a roaming UE from China to the US would skip the Latin characters but would display the character "&", " ", "-", which could be annoying to the user.

Based on all of these issues, the embodiments described below provide for various solutions. In some embodiments the solutions are built on top of the skipping undesirable character solutions. In other embodiments various signaling fields may be provided with a language indicator and the UE may display characters corresponding to the signaling field based on the MMI and skip the display of characters embedded in other signaling fields. In a further embodiment, the UE may send an uplink message with an indication of the language of the MMI that was set by a user and in turn a downlink message would be received in the language of the MMI of the UE. In this example, the UE may use the language of the MMI to determine how display to ambiguous characters. Each of these embodiments is described in more detail below.

Three sources of network names are described above, namely the USIM, NITZ and ME. Of these, the USIM and ME are effectively provided by the user's home operator, leaving NITZ as the only mechanism where the visiting operator can provide information directly to the UE. In this regard, the embodiments below utilize the NITZ mechanism for the network name. However, this is not meant to be limiting, and those skilled in the art will realize that the various embodiments described herein could equally be used with other signaling mechanisms and are therefore not restricted to the NITZ.

Example Architecture

Reference is now made to FIG. 1, which shows a simplified network diagram in accordance with the present disclosure. In FIG. 1, user equipment 110 communicates with a network, comprising, in the simplified embodiment of FIG. 1, radio access network 120 (including but not limited to a base station, node B, evolved Node B (eNB) or next generation Node B (gNB)), and a core network 122, which includes the home subscriber server (HSS)/home location registry (HLR) or visitor location registry (VLR) 124, depending on whether radio access network is a home or visited network for the UE 110.

If radio access network 120 is a visited network, the UE 110 may attempt to connect and authenticate to the visited network. This is done by sending an identity, such as the UE's home network IMSI, through the VLR 124, which then communicates with the HSS/HLR 140 over a network using an interface such as a GLa interface and obtains the authentication vectors as described above with regard to FIG. 1. A challenge and response are then used to authenticate UE 110.

Otherwise, if network 120 is a home network, authentication and attaching is accomplished using HSS/HLR 124.

Data may then be routed from UE 110 through network 120 and core network 122 to Internet 150 (or to any other data network).

Signaling on Top of Skipping Undesirable Characters

In accordance with one embodiment of the present disclosure, information may be introduced in signaling to indicate that a set of characters must not be skipped, as an exception to the 3GPP TS 22.101 requirements. This would allow a user to avoid skipping some Latin characters that are naturally part of the network name, when the MMI is non-Latin.

Figure 2:
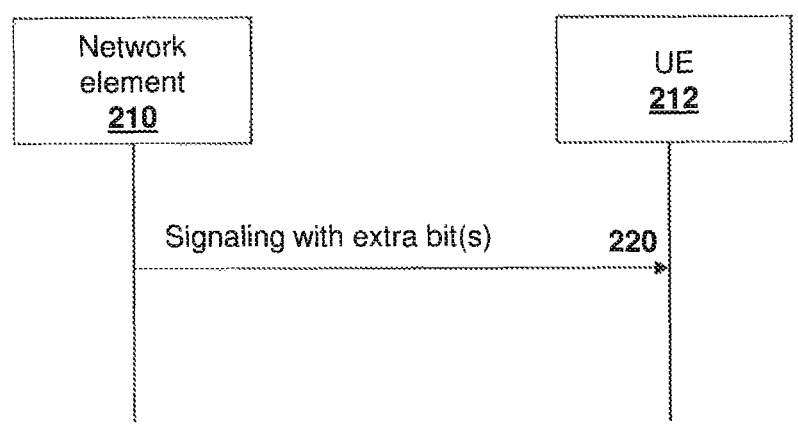
FIG. 2 is a dataflow diagram showing network signaling comprising extra bits to provide an indication for character skipping.

Reference is therefore made to FIG. 2. In the embodiment of FIG. 2, a network element 210 communicates with the UE 212.

The network element may send signaling, shown with message 220, to UE 212. In this case, the signaling could be any signaling between the network element and the UE, and could include information elements, control signaling, among other signaling.

Figure 3:
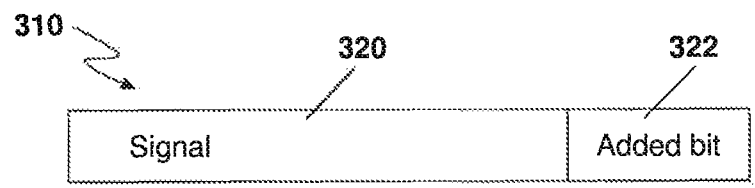
FIG. 3 is a block diagram showing an example message with added bits for providing an indication for character skipping.

The signaling in message 220 could, in some embodiments, include an extra bit. Referring to FIG. 3, a message 310 includes the regular signaling bits 320 as well as an added bit 322. The added bit 322 could, in some cases, mean:

0—no information;

1—ignore skipping a requirement from 3GPP TS 22.101.

While the above is one example, other phrasing is possible.

In this case, when the UE receives the signaling in message 220 or 310, the UE could look at the added bit and base its behavior on such added bit. In particular, if the added bit indicates zero, then the UE can perform the requirements of 3GPP TS 22.101 and ignore Latin characters. Conversely, if the bit indicates one then the UE may take non-Latin characters in conjunction with Latin characters and display all of them.

In addition to, or instead of, the meaning of the additional bit in the above embodiments of FIGS. 2 and 3, the added bit 322 from FIG. 3 could mean:

0—no information;

1—skip character(s) set, even if 3GPP TS 22.101 requires the set to be displayed.

The above alternative meaning for the bit could be used for the symmetrical issue so that it could be used when a Japanese mobile user roams to China for example.

While the various embodiments of FIGS. 2 and 3 above may apply in any message for display at the UE, in some embodiments the applicability of the information may be on a per display feature basis. For example, the embodiments may apply to the NITZ display only in some cases.

In other words, the UE should consider a Latin character or characters if such character or characters are from another language based on the bit defined above. For example, in the SK telecom case above, the UE should consider a Latin character as if it was a Korean character in the skipping requirement process. This does not impact the fact that the Latin character, if displayed, is displayed in Latin. In other words, there is no translation of such Latin character.

Therefore, the meaning of the information bit could be interpreted as:
- 0—no information
- 1—consider this character as Korean in the "skipping process".

In the above case, an information bit may need to be associated with each character and the embodiment of FIG. 3 could be adapted to have a plurality of added bits. A string may therefore require the predetermined number of bits to convey the character, along with an added bit for each character to indicate how that character should be treated.

However, such alternative may require a significant number of bits to code all non-Latin languages. While this may be acceptable in some circumstances, in other situations such added number of bits may be problematic. In this case, an alternative solution may be that the added bit 322 could be:
- 0—no information;
- 1—consider all Latin characters in this IE as the same language of the non-Latin language character(s) included in this IE.

As will be apparent to those skilled in the art, the above is based on a first assumption that a network operator includes character(s) from only one non-Latin language in an IE. Therefore, instead of an IE, other assumptions or granularities can be considered, such as using signaling fields. In one example, an ASN.1 field could be used.

A signaling bit such as that described above could be implemented in a plurality of downlink messages. Examples include: for 2G or 3G (3GPP TS 24.008): Mobility Management (MM) Information message, General Packet Radio Service (GPRS) Mobility Management (GMM) Information message, Temporary Mobile Subscriber Identity (TMSI) REALLOCATION COMMAND message, IDENTITY REQUEST message, LOCATION UPDATING ACCEPT message, ATTACH ACCEPT message. For Long Term Evolution/Enhanced Packet Core (LTE/EPC) (3GPP TS 24.301): Enhanced Packet Services (EPS) Mobility Management (EMM) Information message, GUTI REALLOCATION COMMAND message, AUTHENTICATION REQUEST message, SECURITY MODE COMMAND message, IDENTITY REQUEST message, DETACH ACCEPT message, DETACH REQUEST message, TRACKING AREA UPDATE ACCEPT message, TRACKING AREA UPDATE REJECT message. For 5G Core Network (TS 24.501): CONFIGURATION UPDATE COMMAND message, REGISTRATION ACCEPT message, DEREGISTRATION REQUEST message, REGISTRATION REJECT message, IDENTITY REQUEST message, AUTHENTICATION REQUEST message. Other messages may also be used.

In other cases, new downlink messages could be created for the purpose of such signaling.

Further, while the embodiments above are described with regard to 3GPP systems, in accordance with the present disclosure, the embodiments are not restricted to such 3GPP systems and may be re-applied to other systems, including, but not limited to, Wi-Fi, WiMAX, IEEE 802.11, Hotspot 2.0, among others. In addition, the messages are not required to be related to the Network Name even though the examples in the present disclosure provide for Network Name.

In other embodiments, the change could be performed without signaling, For example, the 3GPP TS 22.101 specification may be changed (as shown in bold) to read, in one case:

"For a PLMN name provided by NITZ, operators using non-Latin characters of the local language (such as Chinese, Japanese, Korean, Vietnamese, Arabic, Hindi, etc.) may include the network name in Latin characters in addition to characters of the local language.

For a PLMN name provided by NITZ, the roaming UE should skip displaying non-Latin character(s) if the language of those character(s) does not match the language of the MMI for the UE. In this process, if non-Latin character(s) are received, the UE should consider all Latin characters in the Network name of the NITZ as from the same language than the non-Latin character(s). If this would lead to no remaining Latin character in the PLMN name, the UE should skip displaying the PLMN name provided by NITZ; the PLMN name stored in the ME has the next priority instead."

In an alternative embodiment, the 3GPP TS 22.101 specification may be changed to read:

"For a PLMN name provided by NITZ, operators using non-Latin characters of the local language (such as Chinese, Japanese, Korean, Vietnamese, Arabic, Hindi, etc.) may include the network name in Latin characters in addition to characters of the local language.

For a PLMN name provided by NITZ, the roaming UE should skip displaying non-Latin character(s) if the language of those character(s) does not match the language of the MMI for the UE. In this process, if non-Latin character(s) are received, the UE should consider all Latin characters sent in the same information element as non-Latin character(s) as from the same language than the non-Latin character(s). If this would lead to no remaining Latin character in the PLMN name, the UE should skip displaying the PLMN name provided by NITZ; the PLMN name stored in the ME has the next priority instead."

From the above changes shown in bold, all Latin characters in either the NITZ Network name or Information Element would be considered to be the same language as the remaining characters.

In addition to the above, one issue may be with some Network names, whether Latin or non-Latin, that could include special characters such as a space " ", dash "–", or ampersand "&". The special characters are not actually considered as Latin characters from the ISO 10646 coding. Therefore, if the carrier indicates for example "AT&T", then the above requirement would result in, in the case of the UE roaming from China to the US, the display of the characters "&", " ", or "–", since the phone would skip the Latin characters but would still display such special characters. Such result may be annoying to the user. Therefore, the 3GPP TS 22.101 could be amended as follows:

"For a PLMN name provided by NITZ, the roaming UE should skip displaying non-Latin character(s) if the language of those character(s) does not match the language of the MMI for the UE. In this process any non-alphabet character received between character(s) of a same language should be considered as character(s) from this language. If this would lead to no remaining Latin character in the PLMN name, the UE should skip displaying the PLMN name provided by NITZ; the PLMN name stored in the ME has the next priority instead."

Furthermore, instead of 3GPP TS 22.101, the requirement could be added to other technical standards such as 3GPP TS 24.008 instead. The new requirement could be introduced, for example, within the message coding or IE coding. The new requirement could read in another language example as:
"consider all characters in this IE (even non-alphabet characters) as Korean alphabet characters"

Another example assumes that the language discriminator is added to the 3GPP TS 24.008 signaling. For example, a language discriminator could apply to each new IE in the MM/GMM information messages, or to a new downlink message introduced. Then the new requirement added to 3GPP TS 24.008 could be rephrased as:
"consider all characters in this IE (even non-alphabet characters or characters from a different language) as alphabet characters from the same language than the language discriminator"

Other phrasing or example solutions are possible.

The above would therefore solve the non-language character skipping issues described above and the Latin/Korean issues described above.

Providing Signaling Fields with Language Indicators

Figures 4, 5:
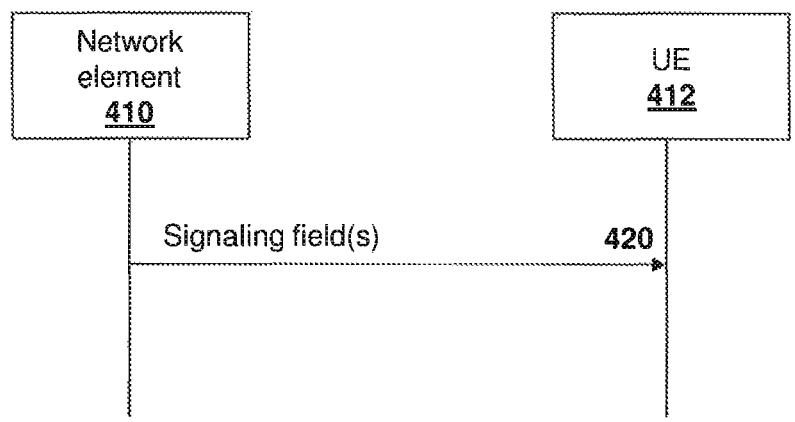
FIG. 4 is a dataflow diagram showing network signaling comprising the providing of a plurality of signaling fields with language indicators.
FIG. 5 is a block diagram of the signaling fields of the message of FIG. 4 providing signaling fields and a language indicator for each signaling field.

In a further embodiment, a network element may send different signaling fields to a UE. In particular, reference is now made to FIG. 4, in which a network element 410 communicates with UE 412. In the example of FIG. 4, message 420 provides for one or more signaling fields, where each signaling field is identified with a language indicator. The UE may select the signaling field that corresponds to the language indicator that corresponds to the language set in the MMI of the UE.

In particular, reference is made to FIG. 5, which shows a plurality of signaling fields 510, each with its own language indicator 512. The UE may then display characters corresponding to the signaling field corresponding to the MMI of the device and skip the display of characters embedded in other signaling fields.

Therefore, in accordance with the embodiment of FIGS. 4 and 5, a selection is performed among characters that are received in different signaling fields, but all characters in that signaling field would be displayed on the UE. This includes characters that include character coding reflective of other languages, or non-alphabet characters. If there is no signaling field that corresponds to the language of the MMI through the use of the language indicator corresponding to each signaling field, then the UE does not use the corresponding display feature and uses the next one from the priority list.

In one specific example, a UE could utilize a new feature, referred to as either "NITZ2" or "network name 2" herein. If the language indicator for such selected field includes the MMI language of the UE, then the Network Name from this field could be used for display.

Conversely, if no such field exists, then the UE would not use this feature and would instead use the ME display feature according to the priority list.

In the priority of the display feature is used by the device, the NITZ2 display feature could sit at different priority points. In one embodiment, the new display feature could sit between the USIM and the ME display as is currently the case for NITZ, but would sit before the current NITZ. In other words, the display feature could be, from highest to lowest priority:
1. USIM network name display;
2. new display feature such as NITZ2;
3. NITZ Network name display;
4. ME Network name display.

However, other priorities are possible. For example, in one alternative, when the UE is not roaming, the NITZ could have a higher priority than the new display feature. Conversely, when the UE is roaming, the NITZ2 could have a higher priority than the NITZ. In another alternative, when the UE is not roaming, the NITZ could have a lower priority than the new display feature; when the UE is roaming, the NITZ2 could have a lower priority than the NITZ.

Further, in some cases, the new display feature may only be used when the user is roaming.

In other cases, the priority of the new display feature can be chosen by the user and/or signaled by the network. If both the user and the network could choose, then either a user choice could take precedence over the network choice, or vice versa.

If the network is choosing, then in one example the network could provide a two-bit field parameter to the UE. This field could take the decimal values 1 to 4, indicating the relative priority of the NITZ2 feature compared to the other priorities. For example, a "1" could indicate that the NITZ2 feature would have the highest priority above the USIM. "2" would mean that the priority would fall between the USIM and the NITZ. "3" would mean that the priority would fall between the NITZ and the ME. "4" would indicate the lowest priority, below the ME.

In the embodiments of FIGS. 4 and 5, the term "signaling field" is used as a general term. Such signaling field could be, for example, an information element inside a message, or a field inside an information element inside a message. In other words, more than one signaling field could be included in one information element.

Further, in some cases, the field could be an ASN.1 field or a CSN.1 field inside a message.

In some cases, the information can be provided to the device via L3 signaling solutions such as 3GPP TS 24.008, 3GPP TS 24.301, or 3GPP TS 24.501.

In other cases, the information could be provided to the UE/USIM via Open Mobile Alliance (OMA) Device Management (DM) or SIM toolkit application.

Therefore, based on the above, the embodiments could be used between two signaling fields provided by two different display features. For example, this could apply between the Network name provided by the NITZ and the Network name or names provided by new display features such as the NITZ2. In one example, the UE would display the network name from the NITZ2 instead of the network name from the NITZ because the network name from the NITZ2 is in the language of the MMI, and the network name from the already existing NITZ is likely not in the language of the MMI.

In another example, the selection of whether to use the NITZ or NITZ2 could be a condition. Specifically, if the new display feature contains a network name in the language of the MMI, then the new display feature could take precedence over the NITZ. Otherwise, the NITZ keeps precedence over the NITZ2. In another example, if the new display feature contains a network name in the language of the MMI, then the new display feature could take precedence over other display feature such as the USIM feature.

In another example, if the NITZ2 does not include a network name in the language of the MMI, then the NITZ2 is completely skipped or not used among all display features.

In still a further embodiment, the NITZ2 priority is affected among the already existing display features depending on whether or not the NITZ2 contains a network name in the language of the MMI.

Further, in some cases, the notion of whether a UE is roaming or not can be added, thus affecting the overall priority of the new display feature and possibly the priority of the existing NITZ.

Furthermore, with regard to the "CJKV ambiguity", in one embodiment the UE uses the language that is indicated by the language indicator and should correspond with the language of the MMI, since only the corresponding network name is associated with the NITZ2. Thus, the ambiguity is resolved.

The above could be implemented in a variety of signaling solutions. Various change requests in the standards could be made. For example, the messages could be, but are not limited to: for 2G or 3G (3GPP TS 24.008): Mobility Management (MM) Information message, General Packet Radio Service (GPRS) Mobility Management (GMM) Information message, Temporary Mobile Subscriber Identity (TMSI) REALLOCATION COMMAND message, IDENTITY REQUEST message, LOCATION UPDATING ACCEPT message, ATTACH ACCEPT message. For Long Term Evolution/Enhanced Packet Core (LTE/EPC) (3GPP TS 24.301): Enhanced Packet Services (EPS) Mobility Management (EMM) Information message, GUTI REALLOCATION COMMAND message, AUTHENTICATION REQUEST message, SECURITY MODE COMMAND message, IDENTITY REQUEST message, DETACH ACCEPT message, DETACH REQUEST message, TRACKING AREA UPDATE ACCEPT message, TRACKING AREA UPDATE REJECT message. For 5G Core Network (TS 24.501): CONFIGURATION UPDATE COMMAND message, REGISTRATION ACCEPT message, DEREGISTRATION REQUEST message, REGISTRATION REJECT message, IDENTITY REQUEST message, AUTHENTICATION REQUEST message. Other messages may also be used.

In other cases, new downlink messages could be created for the purpose of such signaling.

Further, while the embodiments above are described with regard to 3GPP systems, in accordance with the present disclosure, the embodiments are not restricted to such 3GPP systems and may be re-applied to other systems, including, but not limited to, Wi-Fi, WiMAX, IEEE 802.11, Hotspot 2.0, among others. In addition, the messages are not required to be related to the Network Name even though the examples in the present disclosure provide for Network Name.

One example of a change that may be made to the 3GPP TS 24.008 is shown with regard to the bold portions in Appendix A below. It should be noted by those skilled in the art the such change would also cover LTE and 5G since the information elements in the LTE and 5G, namely the 3GPP TS 24.301 and 3GPP TS 24.501 would also point to the information element defined in 3GPP TS 24.008.

As shown in the example of Appendix A, the items in bold may be added. Namely the full network name for network2 as well as that of the short network name for network2.

As further seen in Appendix A, the full network name and short network name are defined, as well as the definition of which network name 2 to use based on a language discriminator.

In the changes of Appendix A, a new information element is provided, as shown in FIG. 6 of the present disclosure.

Furthermore, a change may be made to 3GPP TS 24.301, as shown in Appendix B below. As seen in Appendix B, the additions to this standard are shown in bold, and are similar to those described above.

Further, changes may also be made to 3GPP TS 24.501, which are shown in bold in Appendix C below. Such changes are similar to those described above with regards to Appendix A or Appendix B.

Also, changes to the 3GPP TS 22.101 for the country/PLMN indication are shown with regard to Appendix D below. In particular, the changes are shown in bold and introduce the NITZ2.

UE Indicating the Language of the MMI to the Network

In a further embodiment of the present disclosure the UE could send an uplink message to the network providing an indication of the language of the MMI that is, or was, set by a user on that UE. This may be done in order to address language incomprehension. In turn, a downlink message may be provided to the UE in which the UE receives a text string for the UE to display in the language of the MMI of the UE.

Furthermore, the embodiments described below provide additional features for this concept.

In the present case, if the UE receives a message which includes a text string that contains one or more ambiguous characters, the UE may use the language of the MMI to determine how to display the ambiguous characters. This differs from existing solutions where the UE uses the language from the country of the MCC received from the network in the PLMN ID.

Figure 7:
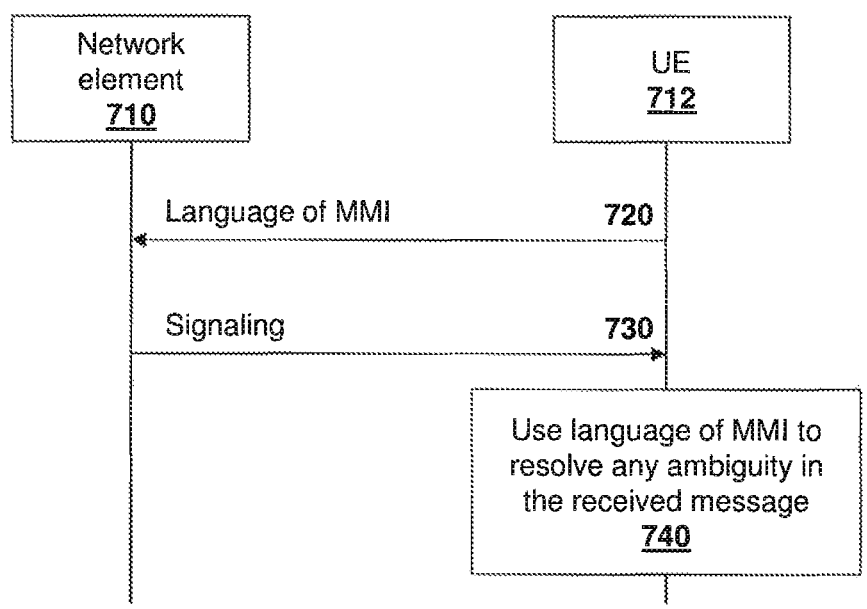
FIG. 7 is a dataflow diagram showing signaling between a network element and a user equipment in which the user equipment provides a language indication to the network element.

In particular, reference is now made to FIG. 7. In the embodiment of FIG. 7, a network element 710 communicates with a UE 712.

In the case of FIG. 7, the UE 712 provides a message 720 indicating the language of the MMI of such UE. In response, signaling in message 730 includes information in the language of the MMI.

If message 730 includes ambiguous characters, the UE 712 uses the language of the MMI to determine how to display the ambiguous characters, as shown at block 740.

The feature priority with regard to the information in message 730 could be handled similarly to that above. In particular, the feature priority could be set to be in any spot between the existing three priority levels and could be set by a user or a network. If the priorities are set by the network, then the priority could be based on a two-bit field provided by the network to indicate where the priority level should be.

In other cases, the priority could be predetermined or could be set based on whether the UE is roaming or not.

Other examples based on the present disclosure would be evident to those skilled in the art.

Furthermore, the solutions from the first embodiment described above with regard to embodiments on top of the skipping characters could be implemented in the present embodiment. In the case of the present embodiment, the phrasing could be slightly different in the various standards. For example, a new requirement may be added to 3GPP TS 24.008 that could be rephrased as follows:

"Consider all characters in this IE (even non-alphabet characters or characters from a different language) as alphabet characters from the language of the MMP"

Other phrasings or example solutions are possible.

In order to solve the "CJKV ambiguity", for the related ambiguous characters, in one example embodiment the UE may use the language of the MMI of the UE that should correspond to the language used by the network for the Network Name field.

The above may be implemented through a variety of changes. For example, Appendix E shows one example change in bold to the 3GPP TS 22.101 specification which includes character skipping. In this example, the PLNN provided by the NITZ2 should be displayed in its entirety, even if such name and includes non-alphabet characters or characters coded with different languages than the MMI.

A further example is provided in bold with regard to Appendix F below. In this example, character skipping that was previously introduced in 2019 to the 3GPP TS 22.101 specification has been removed. Instead, the NITZ2 is indicated to take precedence over the NITZ and all provided characters should be considered to be in the indicated language of the MMI.

Further, in the present embodiment, changes to 3GPP TS 24.301 may be the same as those provided in Appendix B.

Similarly, in the present embodiment, changes to 3GPP TS 24.501 may be the same as those provided in Appendix C.

Figure 8:
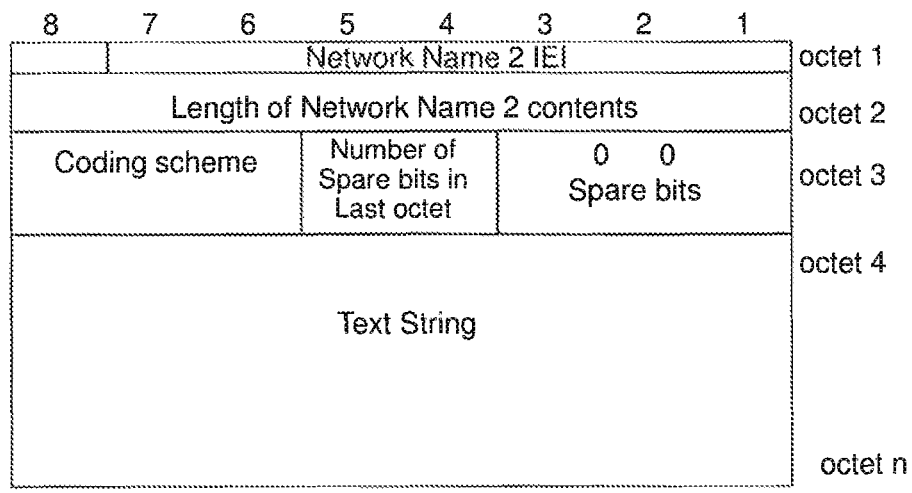
FIG. 8 is a block diagram showing an example information element used when the network element knows the language of the Man-Machine Interface (MMI) of the user equipment.

A change to the 3GPP TS 24.008 can be made to include the network name 2, as shown in bold in Appendix G below. In this change, a new information element is provided as shown in FIG. 8 of the present disclosure.

The above therefore provides for the display of characters in a language appropriate to a user of a user equipment.

Any user equipment could be used to implement the above. One example user equipment is shown below with regards to FIG. 9.

UE 900 may be a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, an Internet of Things endpoint, as examples.

Where UE 900 is enabled for two-way communication, it may incorporate a communication subsystem 911, including both a receiver 912 and a transmitter 914, as well as associated components such as one or more antenna elements 916 and 918, local oscillators (LOs) 913, and a processing module such as a digital signal processor (DSP) 920. Although not shown, communication subsystem 911 may include additional components. For example, UE 900 may comprise multiple receivers 912 and/or transmitters 914 to allow for simultaneous radio activity. In addition, as will be apparent to those skilled in the field of communications, the particular design of the communication subsystem 911 will be dependent upon the communication network in which the device is intended to operate.

Network access requirements will also vary depending upon the type of network 919. In some networks network access is associated with a subscriber or user of UE 900. A UE may require one or more smart cards such as a UICC in order to operate on a network. The smart card interface 944 is normally similar to a card-slot into which a smart card can be inserted and ejected. The smart card can have memory and hold many key configurations 951, and other information 953 such as identification, and subscriber related information.

Figure 9:
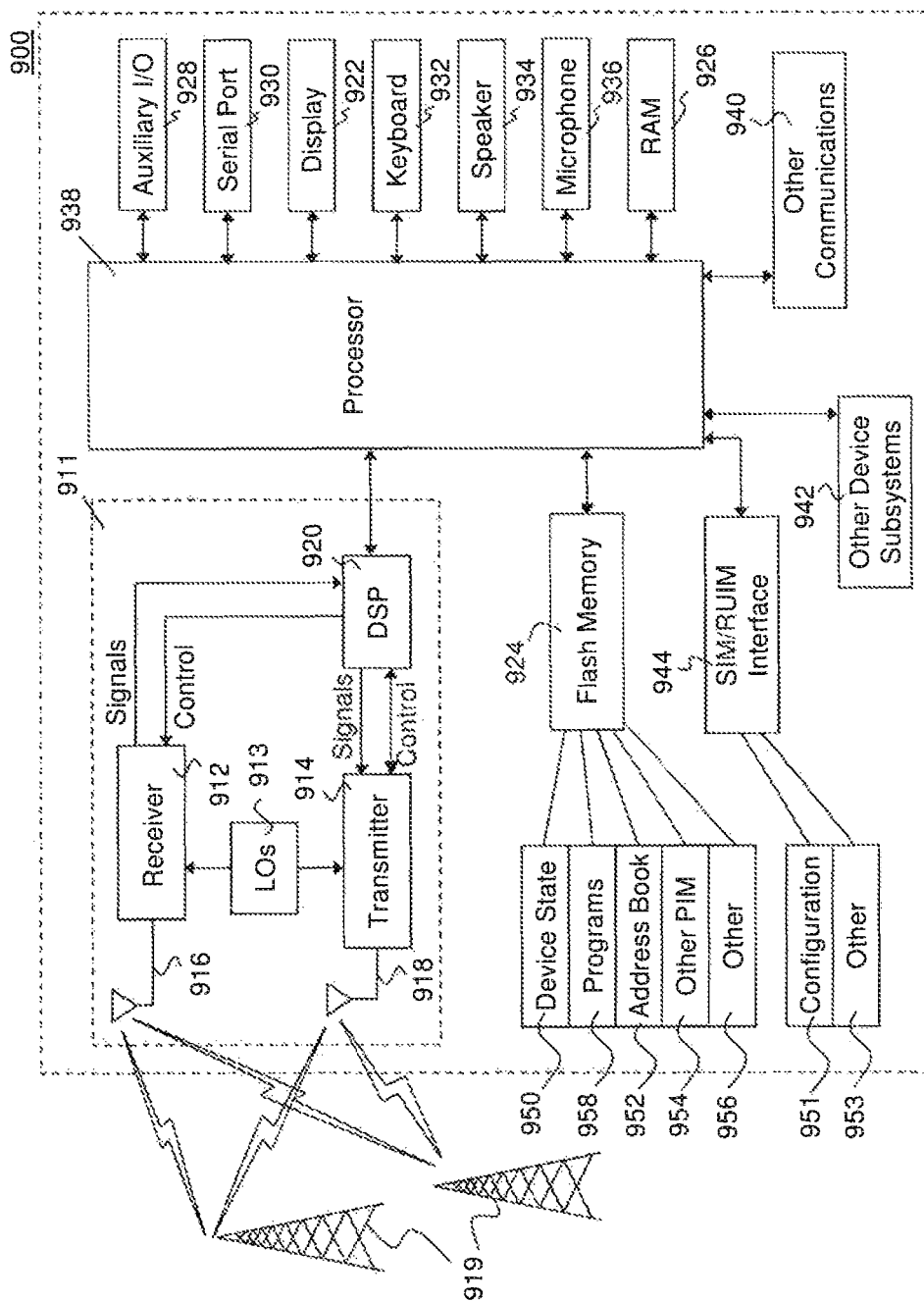
FIG. 9 is a block diagram of an example user equipment capable of being used with the embodiments of the present disclosure.

When required network registration or activation procedures have been completed, UE 900 may send and receive communication signals over the network 919. As illustrated in FIG. 9, network 919 can consist of multiple base stations communicating with the UE.

Signals received by antenna 916 through communication network 919 are input to receiver 912, which may perform such common receiver functions as signal amplification, frequency down conversion, filtering, channel selection and the like. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 919 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

UE 900 generally includes a processor 938 which controls the overall operation of the device. Communication functions, including data and voice communications, are performed through communication subsystem 911. Processor 938 also interacts with further device subsystems such as the display 922, flash memory 924, random access memory (RAM) 926, auxiliary input/output (I/O) subsystems 928, serial port 930, one or more keyboards or keypads 932, speaker 934, microphone 936, other communication subsystem 940 such as a short-range communications subsystem and any other device subsystems generally designated as 942. Serial port 930 could include a USB port or other port known to those in the art.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the processor 938 may be stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Processor 938, in addition to its operating system functions, may enable execution of software applications on the UE. A predetermined set of applications that control basic operations, including at least data and voice communication applications for example, will normally be installed on UE 900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

In a data communication mode, a received signal such as a text message or web page download will be processed by the communication subsystem 911 and input to the processor 938, which may further process the received signal for output to the display 922, or alternatively to an auxiliary I/O device 928.

A user of UE 900 may also compose data items such as email messages for example, using the keyboard 932, which may be a complete alphanumeric keyboard or telephone-type keypad, among others, in conjunction with the display 922 and possibly an auxiliary I/O device 928. In other cases, keyboard 932 may be a virtual keyboard on display 922.

Such composed items may then be transmitted over a communication network through the communication subsystem 911.

For voice communications, overall operation of UE 900 is similar, except that received signals would typically be output to a speaker 934 and signals for transmission would be generated by a microphone 936. Alternative voice or audio I/O subsystems, such as a voice message recording subsystem, may also be implemented on UE 900. Although voice or audio signal output is generally accomplished primarily through the speaker 934, display 922 may also be used to provide an indication of the identity of a calling party, the duration of a voice call, or other voice call related information for example.

Serial port 930 in FIG. 9 may be used for a variety of purposes, including synchronization with a user's desktop computer (not shown), enabling a user to set preferences through an external device or software application and would extend the capabilities of UE 900 by providing for information or software downloads to UE 900 other than through a wireless communication network. The alternate download path may for example be used to load an encryption key onto the device through a direct and thus reliable and trusted connection to thereby enable secure device communication. As will be appreciated by those skilled in the art, serial port 930 can further be used to connect the UE to a computer to act as a modem, or may be used for charging the device.

Other communications subsystems 940, such as a short-range communications subsystem, is a further optional component which may provide for communication between UE 900 and different systems or devices, which need not necessarily be similar devices. For example, the subsystem 940 may include an infrared device and associated circuits and components or a Bluetooth™ communication module to provide for communication with similarly enabled systems and devices. Subsystem 940 may further include non-cellular communications such as WiFi or WiMAX.

Figure 10:
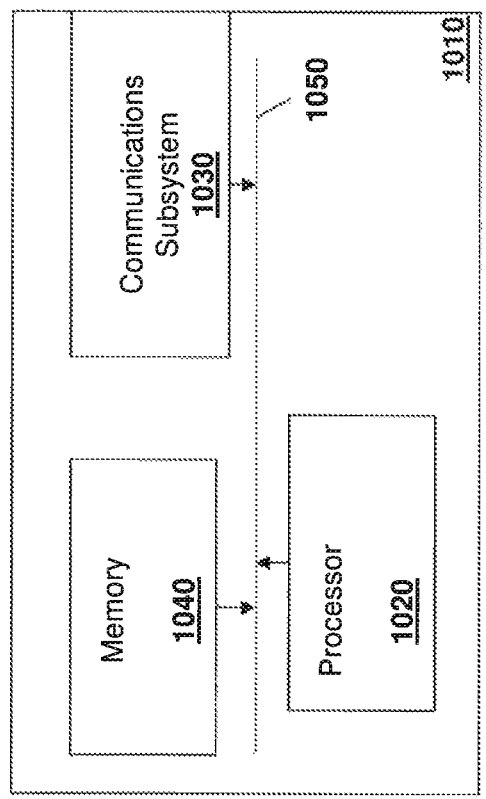
FIG. 10 is a block diagram of a simplified network element capable of being used with the embodiments of the present disclosure.

Further, the network elements referred to and shown herein may be any network element, or part of any network element, including various network servers. Reference is now made to FIG. 10, which shows a generalized example network element.

In FIG. 10, network element 1010 includes a processor 1020 and a communications subsystem 1030, where the processor 1020 and communications subsystem 1030 cooperate to perform the methods of the embodiments described above.

Processor 1020 is configured to execute programmable logic, which may be stored, along with data, on network element 1010, and shown in the example of FIG. 10 as memory 1040. Memory 1040 can be any tangible storage medium.

Alternatively, or in addition to memory 1040, network element 1010 may access data or programmable logic from an external storage medium, for example through communications subsystem 1030.

Communications subsystem 1030 allows network element 1010 to communicate with other network elements.

Communications between the various elements of network element 1010 may be through an internal bus 1050 in one embodiment. However, other forms of communication are possible.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A—Example Change to 3GPP TS 24.008

9.2.15a MM Information

This message is sent by the network to the mobile station to provide the mobile station with subscriber specific information. See table 9.2.18/3GPP TS 24.008.

Message type: MM INFORMATION
Significance: dual
Direction: network to mobile station Table 9.2.18/3GPP TS 24.008 MM INFORMATION message content

| IEI | Information element | Type/Reference | Presence | Format | Length |
|---|---|---|---|---|---|
| | Mobility management protocol discriminator | Protocol discriminator 10.2 | M | V | 1/2 |
| | Skip Indicator | Skip Indicator 10.3.1 | M | V | 1/2 |
| | MM Information message type | Message type 10.4 | M | V | 1 |
| 43 | Full name for network | Network Name 10.5.3.5a | O | TLV | 3-? |

-continued

Table 9.2.18/3GPP TS 24.008 MM INFORMATION message content

| IEI | Information element | Type/Reference | Presence | Format | Length |
|---|---|---|---|---|---|
| 45 | Short name for network | Network Name 10.5.3.5a | O | TLV | 3-? |
| 46 | Local time zone | Time Zone 10.5.3.8 | O | TV | 2 |
| 47 | Universal time and local time zone | Time Zone and Time 10.5.3.9 | O | TV | 8 |
| 48 | LSA Identity | LSA Identifier 10.5.3.11 | O | TLV | 2-5 |
| 49 | Network Daylight Saving Time | Daylight Saving Time 10.5.3.12 | O | TLV | 3 |
| tbd | Full name for network 2 | Network Name 2 a.b.c.d | O | TLV | 3-? |
| tbd | Short name for network 2 | Network Name 2 a.b.c.d | O | TLV | 3-? |

9.2.15a.1 Full Name for Network

This IE may be sent by the network. If this IE is sent, the contents of this IE indicate the "full length name of the network" that the network wishes the mobile station to associate with the MCC and MNC contained in the Location Area Identification of the cell to which the mobile station sent its Channel Request message.

9.2.15a.2 Short Name for Network

This IE may be sent by the network. If this IE is sent, the contents of this IE indicate the "abbreviated name of the network" that the network wishes the mobile station to associate with the MCC and MNC contained in the Location Area Identification of the cell to which the mobile station sent its Channel Request message.

9.2.15a.3 Local Time Zone

This IE may be sent by the network. The mobile station should assume that this time zone applies to the Location Area of the cell to which the Channel Request message was sent.

If the local time zone has been adjusted for Daylight Saving Time, the network shall indicate this by including the IE Network Daylight Saving Time.

9.2.15a.4 Universal Time and Local Time Zone

This IE may be sent by the network. The mobile station should assume that this time zone applies to the Location Area of the cell to which the Channel Request message was sent. The mobile station shall not assume that the time information is accurate.

If the local time zone has been adjusted for Daylight Saving Time, the network shall indicate this by including the IE Network Daylight Saving Time.

9.2.15a.5 LSA Identity

This IE may be sent by the network. The contents of this IE indicate the LSA identity of the serving cell.

9.2.15a.6 Network Daylight Saving Time

This IE may be sent by the network. If this IE is sent, the contents of this IE indicates the value that has been used to adjust the local time zone.

9.2.15a.7 Full Name for Network 2

This IE may be sent by the network. If this IE is sent, the contents of this IE indicate the "full length name of the network" that the network wishes the mobile station to associate with the MCC and MNC contained in the Location Area Identification of the cell to which the mobile station sent its Channel Request message.

9.2.15a.8 Short Name for Network 2

This IE may be sent by the network. If this IE is sent, the contents of this IE indicate the "abbreviated name of the network" that the network wishes the mobile station to associate with the MCC and MNC contained in the Location Area Identification of the cell to which the mobile station sent its Channel Request message.

a.b.c.d Network Name 2

The purpose of this information element is to pass a text string to the mobile station, in addition to the text string provided in the information element Network Name.

The Network Name 2 information element is coded as shown in figure x1.y1.z1/3GPP TS 24.008 and table x2.y2.z2/3GPP TS 24.008.

The MS shall consider all characters as associated with a language discriminator (even non-language characters or characters with coding indicating a different language) as alphabet characters from the language of the language discriminator for the purpose of the network name display requirements specified in 3GPP TS 22.101 [8] Annex A.3.

If the coding scheme UCS2 is used and Chinese-Japanese-Korean-Vietnamese (CJKV) ideographs as defined in ISO/IEC 10646 [72] are received in the text string, the MS shall use [Alt1: the corresponding language indicator] [Alt2: the language of the MMI] to determine the language for those CJKV ideographs.

NOTE: This is due to CJKV ideograph language ambiguity in UCS2, in the sense that the same hexadecimal code can be mapped to different character displays dependent on the used language. The coding of CJKV ideographs itself does not allow to discriminate the CJKV ideograph language.

The Network Name 2 is a type 4 information element with a minimum length of 3 octets. No upper length limit is specified except for that given by the maximum number of octets in a L3 message (see 3GPP TS 44.006 [19]).

Figure x1.y1.z1/3GPP TS 24.008 Network Name 2 information element—SEE FIG. 6 of the present disclosure for this Figure.

TABLE x2.y2.z2/3GPP TS 24.008 Network Name 2 information element

Number of additional languages (octet 3, bits 4-5)

| 5 | 4 | |
|---|---|---|
| 0 | 0 | 1 additional language |
| 0 | 1 | 2 additional languages |
| 1 | 0 | 3 additional languages |
| 1 | 1 | 4 additional languages |

Language discriminator (octets 5, 8 + a, 11 + a + b, 14 + a + b + c)

| 8 | 7 | 6 | 5 | 4 | 3 | 2 | 1 | |
|---|---|---|---|---|---|---|---|---|
| 0 | 0 | 0 | 0 | 0 | 0 | 0 | 0 | Latin |
| 0 | 0 | 0 | 0 | 0 | 0 | 0 | 1 | Greek |
| 0 | 0 | 0 | 0 | 0 | 0 | 1 | 0 | Arabic |
| . . . [non exhaustive list] | | | | | | | | |
| 1 | 1 | 1 | 1 | 1 | 1 | 1 | 1 | Chinese-G |

Number of octets for each text string of languages (octets 4, 7 + a, 10 + a + b, 13 + a + b + c)

| 8 | 7 | 6 | 5 | 4 | 3 | 2 | 1 | |
|---|---|---|---|---|---|---|---|---|
| 0 | 0 | 0 | 0 | 0 | | | | 1 octet |
| 0 | 0 | 0 | 0 | 1 | | | | 2 octets |
| 0 | 0 | 0 | 1 | 0 | | | | 3 octets |
| 0 | 0 | 0 | 1 | 1 | | | | 4 octets |
| 0 | 0 | 1 | 0 | 0 | | | | 5 octets |
| 0 | 0 | 1 | 0 | 1 | | | | 6 octets |
| 0 | 0 | 1 | 1 | 0 | | | | 7 octets |
| 0 | 0 | 1 | 1 | 1 | 37 | | | 8 octets |
| 0 | 1 | 0 | 0 | 0 | | | | 9 octets |
| 0 | 1 | 0 | 0 | 1 | | | | 10 octets |
| 0 | 1 | 0 | 1 | 0 | | | | 11 octets |
| 0 | 0 | 1 | bit 8 is spare and set to "0" in octet | | | | | |
| 0 | 1 | 0 | bits 7 and 8 are spare and set to "0" in octet | | | | | |
| 0 | 1 | 1 | bits 6 to 8(inclusive) are spare and set to "0" in octet | | | | | |
| 1 | 0 | 0 | bits 5 to 8(inclusive) are spare and set to "0" in octet | | | | | |
| 1 | 0 | 1 | bits 4 to 8(inclusive) are spare and set to "0" in octet | | | | | |
| 1 | 1 | 0 | bits 3 to 8(inclusive) are spare and set to "0" in octet | | | | | |
| 1 | 1 | 1 | bits 2 to 8(inclusive) are spare and set to "0" in octet | | | | | |
| 0 | 0 | 0 | this field carries no information about the number of spare bits in octet | | | | | |

Coding Scheme (octet 3, bits 6-8)

| | | | |
|---|---|---|---|
| 0 | 0 | 0 | Cell Broadcast data coding scheme, GSM default alphabet, language unspecified, defined in 3GPP TS 23.038 [8b] |
| 0 | 0 | 1 | UCS2(16bit) [72] |
| 0 | 1 | 0 | |
| to reserved | | | |
| 1 | 1 | 1 | |

Text Strings

Encoded according to the Coding Scheme defined by octet 3, bits 6-8

APPENDIX B—Example Change to 3GPP TS 24.301

8.2.13 EMM Information
8.2.13.1 Message Definition
This message is sent by the network at any time during EMM context is established to send certain information to the UE. See table 8.2.13.1.
Message type: EMM INFORMATION
Significance: local
Direction: network to UE

TABLE 8.2.13.1

EMM INFORMATION message content

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | EMM information message identity | Message type 9.8 | M | V | 1 |
| 43 | Full name for network | Network name 9.9.3.24 | O | TLV | 3-n |
| 45 | Short name for network | Network name 9.9.3.24 | O | TLV | 3-n |
| 46 | Local time zone | Time zone 9.9.3.29 | O | TV | 2 |
| 47 | Universal time and local time zone | Time zone and time 9.9.3.30 | O | TV | 8 |
| 49 | Network daylight saving time | Daylight saving time 9.9.3.6 | O | TLV | 3 |
| tbd | Full name for network 2 | Network name 2 A3.b3.c3.d3 | O | TLV | 3-n |
| tbd | Short name for network 2 | Network name 2 A3.b3.c3.d3 | O | TLV | 3-n |

8.2.13.2 Full Name for Network
This IE may be sent by the network. If this IE is sent, the contents of this IE indicate the "full length name of the network" that the network wishes the UE to associate with the MCC and MNC contained in the last visited tracking area identification.
8.2.13.3 Short Name for Network
This IE may be sent by the network. If this IE is sent, the contents of this IE indicate the "abbreviated name of the network" that the network wishes the UE to associate with the MCC and MNC contained in the last visited tracking area identification.
8.2.13.4 Local Time Zone
This IE may be sent by the network. The UE should assume that this time zone applies to the tracking area of the current cell, and also applies to the tracking area list if available in the UE.
NOTE: The time information can be inaccurate, especially when the TAI list includes tracking areas belonging to different time zones.
If the local time zone has been adjusted for daylight saving time, the network shall indicate this by including the Network daylight saving time IE.
8.2.13.5 Universal Time and Local Time Zone
This IE may be sent by the network. The UE should assume that this time zone applies to the tracking area the UE is currently in, and also applies to the tracking area list if available in the UE. The UE shall not assume that the time information is accurate.
NOTE: The time information can be inaccurate, especially when the TAI list includes tracking areas belonging to different time zones.
If the local time zone has been adjusted for daylight saving time, the network shall indicate this by including the Network daylight saving time IE.
8.2.13.6 Network Daylight Saving Time
This IE may be sent by the network. If this IE is sent, the contents of this IE indicates the value that has been used to adjust the local time zone.
8.2.13.7 Full Name for Network 2
This IE may be sent by the network. If this IE is sent, the contents of this IE indicate the "full length name of the network" that the network wishes the UE to associate with the MCC and MNC contained in the last visited tracking area identification.
8.2.13.8 Short Name for Network 2
This IE may be sent by the network. If this IE is sent, the contents of this IE indicate the "abbreviated name of the network" that the network wishes the UE to associate with the MCC and MNC contained in the last visited tracking area identification.
9.9.3.24 Network Name 2
See subclause a.b.c.d in 3GPP TS 24.008 [13].

APPENDIX C—Example Change for 3GPP TS 24.501

8.2.19 Configuration Update Command
8.2.19.1 Message Definition
The CONFIGURATION UPDATE COMMAND message is sent by the AMF to the UE.
See table 8.2.19.1.1.
Message type: CONFIGURATION UPDATE COMMAND
Significance: dual
Direction: network to UE

TABLE 8.2.19.1.1

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Configuration update command message identity | Message type 9.7 | M | V | 1 |
| D- | Configuration update indication | Configuration update indication 9.11.3.18 | O | TV | 1 |
| 77 | 5G-GUTI | 5GS mobile identity 9.11.3.4 | O | TLV-E | 14 |
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 27 | Service area list | Service area list 9.11.3.49 | O | TLV | 6-114 |
| 43 | Full name for network | Network name 9.11.3.35 | O | TLV | 3-n |
| 45 | Short name for network | Network name 9.11.3.35 | O | TLV | 3-n |
| 46 | Local time zone | Time zone 9.11.3.52 | O | TV | 2 |
| 47 | Universal time and local time zone | Time zone and time 9.11.3.53 | O | TV | 8 |
| 49 | Network daylight saving time | Daylight saving time 9.11.3.19 | O | TLV | 3 |
| 79 | LADN information | LADN information 9.11.3.30 | O | TLV-E | 3-1715 |
| B- | MICO indication | MICO indication 9.11.3.31 | O | TV | 1 |
| 9- | Network slicing indication | Network slicing indication 9.11.3.36 | O | TV | 1 |
| 31 | Configured NSSAI | NSSAI 9.11.3.37 | O | TLV | 4-146 |
| 11 | Rejected NSSAI | Rejected NSSAI 9.11.3.46 | O | TLV | 4-42 |
| 76 | Operator-defined access category definitions | Operator-defined access category definitions 9.11.3.38 | O | TLV-E | 3-n |
| F- | SMS indication | SMS indication 9.11.3.50A | O | TV | 1 |
| Tbd | T3447 value | GPRS timer 3 9.11.2.5 | O | TLV | 3 |
| Tbd | Full name for network 2 | Network name 2 a2.b2.c2.d2 | O | TLV | 3-n |
| Tbd | Short name for network 2 | Network Name 2 A2.b2.c2.d2 | O | TLV | 3-n |

8.2.19.2 Configuration Update Indication

The AMF shall include this IE if the AMF needs to request an acknowledgement or a registration procedure from the UE.

8.2.19.3 5G-GUTI

This IE may be included to assign a new 5G GUTI to the UE.

8.2.19.4 TAI List

This IE may be included to assign a new TAI list to the UE.

8.2.19.5 Allowed NSSAI

This IE may be included to assign a new allowed NSSAI to the UE.

8.2.19.6 Service Area List

This IE may be included to assign a new service area list to the UE.

8.2.19.7 Full Name for Network

This IE may be included to assign a new full name for network to the UE.

8.2.19.8 Short Nname for Network

This IE may be included to assign a new short name for network to the UE.

8.2.19.9 Local Time Zone

This IE may be included to assign a new local time zone to the UE.

8.2.19.10 Universal Time and Local Time Zone

This IE may be included to assign new universal time and local time zone to the UE.

8.2.19.11 Network Daylight Saving Time

This IE may be included to assign new network daylight saving time to the UE.

8.2.19.12 LADN Information

This IE may be included to assign new LADN information to the UE or delete the LADN information at the UE side.

8.2.19.13 MICO Indication

This IE may be included to request the UE to re-negotiate MICO mode.

8.2.19.14 Network Slicing Indication

This IE shall be included if the user's network slicing subscription has changed in the UDM.

8.2.19.15 Configured NSSAI

The AMF shall include this IE when the AMF needs to provide the UE with a new configured NSSAI for the current PLMN.

8.2.19.16 Rejected NSSAI

The network may include this IE to inform the UE of the S-NSSAIs that were previously sent to the UE in the allowed NSSAI, but are now considered to be rejected by the network.

8.2.19.17 Operator-Defined Access Category Definitions

This IE may be included to assign new operator-defined access category definitions to the UE or delete the operator-defined access category definitions at the UE side.

8.2.19.18 SMS Indication

This IE may be included to indicate that the ability for the UE to use SMS over NAS has changed.

8.2.19.19 This IE may be included to assign a new T3447 value to the UE.

8.2.19.20 Full Name for Network

This IE may be included to assign a new full name for network to the UE.

8.2.19.21 Short Name for Network

This IE may be included to assign a new short name for network to the UE.

A2.b2.c2.d2 Network Name 2

See subclause a.b.c.d in 3GPP TS 24.008 [12].

APPENDIX D—Example Change to 3GPP TS 22.101

A.3 Country/PLMN Indication

The country/PLMN indicator shows in which PLMN the UE is currently registered. This indicator is necessary so that the user knows when "roaming" is taking place and that the choice of PLMN is correct. Both the country and PLMN will be indicated. When more than one visited PLMN is available in a given area such information will be indicated.

The PLMN name is either:
Stored in the ME and associated with the MCC+MNC combination received on the broadcast channel;
NITZ/NITZ2 (see 22.042 [17]) (in which case it overrides the name stored in the ME);
stored in the USIM in text and/or graphic format and associated with the MCC+MNC combination, and optionally the LAI, received on the broadcast channel (in which case it overrides the name stored in the UE and—if present—the NITZ/NITZ2 name).

It shall be possible to store on the USIM at least 10 PLMN Identifications (MCC+MNC combination and optionally the LAI) for which the same PLMN name shall be displayed.

The PLMN name stored in the USIM has the highest priority, followed by the PLMN name provided by NITZ/NITZ2. The PLMN name stored in the ME has the lowest priority.

If the PLMN name stored in the USIM is not available in text format and the UE is unable to display the graphic format, the PLMN name provided by NITZ/NITZ2 has the highest priority, the PLMN name stored in the ME has the next priority.

For a PLMN name provided by NITZ, operators using non-Latin characters of the local language (such as Chinese, Japanese, Korean, Vietnamese, Arabic, Hindi, etc.) may include the network name in Latin characters in addition to characters of the local language. For a PLMN name provided by NITZ2, operators may include the network name in non-Latin characters from non-local languages.

For a PLMN name provided by NITZ, the roaming UE should skip displaying non-Latin character(s) if the language of those character(s) does not match the language of the MMI for the UE (Latin is considered as one language). The NITZ2 takes precedence on the NITZ. For PLMN names provided by NITZ2, the UE shall display only the network name which is indicated as in the language of the MMI; in this process, for this network name, non-language characters or characters coded in other languages are [alt1: still displayed] [alt2: considered as character of the language of the MMI]. If this would lead to no remaining Latin alphabet character in the PLMN name, the UE should skip displaying the PLMN name provided by NITZ2/NITZ; the PLMN name stored in the ME has the next priority instead.

APPENDIX E—Example Changes to 3GPP TS 22.101

A.3 Country/PLMN Indication

The country/PLMN indicator shows in which PLMN the UE is currently registered. This indicator is necessary so that the user knows when "roaming" is taking place and that the choice of PLMN is correct. Both the country and PLMN will be indicated. When more than one visited PLMN is available in a given area such information will be indicated.

The PLMN name is either:
Stored in the ME and associated with the MCC+MNC combination received on the broadcast channel;
NITZ/NITZ2 (see 22.042 [17]) (in which case it overrides the name stored in the ME);
stored in the USIM in text and/or graphic format and associated with the MCC+MNC combination, and optionally the LAI, received on the broadcast channel (in which case it overrides the name stored in the UE and—if present—the NITZ/NITZ2 name).

It shall be possible to store on the USIM at least 10 PLMN Identifications (MCC+MNC combination and optionally the LAI) for which the same PLMN name shall be displayed.

The PLMN name stored in the USIM has the highest priority, followed by the PLMN name provided by NITZ/NITZ2. The PLMN name stored in the ME has the lowest priority.

If the PLMN name stored in the USIM is not available in text format and the UE is unable to display the graphic format, the PLMN name provided by NITZ/NITZ2 has the highest priority, the PLMN name stored in the ME has the next priority.

For a PLMN name provided by NITZ, operators using non-Latin characters of the local language (such as Chinese, Japanese, Korean, Vietnamese, Arabic, Hindi, etc.) may include the network name in Latin characters in addition to characters of the local language. For a PLMN name provided by NITZ2, operators may include the network name in the language of the MMI of the UE.

For a PLMN name provided by NITZ, the UE should skip displaying character(s) if the language of those character(s) does not match the language of the MMI for the UE (Latin is considered as one language). The NITZ2 takes precedence on the NITZ. For a PLMN name provided by NITZ2, the UE should display all provided characters as indicated as in the language of the MMI (even non-alphabet characters or characters coded with different languages than the MMI). If this would lead to no remaining character in the PLMN name for NITZ/NITZ2, the UE should skip displaying the PLMN name provided by NITZ/NITZ2; the PLMN name stored in the ME has the next priority instead.

APPENDIX F—Example Changes to 3GPP TS 22.101

A.3 Country/PLMN Indication

The country/PLMN indicator shows in which PLMN the UE is currently registered. This indicator is necessary so that the user knows when "roaming" is taking place and that the choice of PLMN is correct. Both the country and PLMN will be indicated. When more than one visited PLMN is available in a given area such information will be indicated.

The PLMN name is either:
Stored in the ME and associated with the MCC+MNC combination received on the broadcast channel;
NITZ/NITZ2 (see 22.042 [17]) (in which case it overrides the name stored in the ME);
stored in the USIM in text and/or graphic format and associated with the MCC+MNC combination, and optionally the LAI, received on the broadcast channel (in which case it overrides the name stored in the UE and—if present—the NITZ/NITZ2 name).

It shall be possible to store on the USIM at least 10 PLMN Identifications (MCC+MNC combination and optionally the LAI) for which the same PLMN name shall be displayed.

The PLMN name stored in the USIM has the highest priority, followed by the PLMN name provided by NITZ/NITZ2. The PLMN name stored in the ME has the lowest priority.

If the PLMN name stored in the USIM is not available in text format and the UE is unable to display the graphic format, the PLMN name provided by NITZ/NITZ2 has the highest priority, the PLMN name stored in the ME has the next priority.

For a PLMN name provided by NITZ the operators ~~using non-Latin~~ characters ~~of the~~, local language, ~~(such as Chinese, Japanese, Korean, Vietnamese, Arabic, Hindi,~~ may include the network name in ~~Latin characters in addition to~~ characters of the local language. For a PLMN name provided by NITZ2, the operator may include the network name in the language of the MMI of the UE. As the NITZ2 contains the network name in the language of the MMI, a PLMN name provided by NITZ2 takes precedence on the NITZ (the UE does not display the network name provided by the NITZ when the NITZ2 is available). For a PLMN name provided by NITZ2, the UE should display all provided characters as indicated in the language of the MMI (even non-alphabet characters or characters with different language codes). ~~For a PLMN name provided by NITZ, the roaming UE should skip displaying~~ non-Latin ~~character(s) if the language of those character(s) does not match the language of the MMI for the UE. If this woud lead to no remaining Latin character in the PLMN name, the UE should skip displaying the PLMN name provided by NITZ; the PLMN name stored in the ME has the next priority instead.~~

APPENDIX G—Example Change to 3GPP TS 24.008

10.5.3.5a Network Name

The purpose of this information element is to pass a text string to the mobile station.

The Network Name information element is coded as shown in FIG. 10.5.80/3GPP TS 24.008 and table 10.5.94/3GPP TS 24.008.

If the coding scheme UCS2 is used and Chinese-Japanese-Korean-Vietnamese (CJKV) ideographs as defined in ISO/IEC 10646 [72] are received in the text string, the MS shall use the MCC of the PLMN from which it received the network name information element to determine the language for those CJKV ideographs as specified in table 10.5.93a/3GPP TS 24.008:

Table 10.5.93a/3GPP TS 24.008: MCC to CJKV ideograph language mapping table

| MCC(s) | Country/Region | Language (C, J, K, or V) |
|---|---|---|
| 460, 461 | Mainland China | Chinese-G |
| 466 | Taiwan | Chinese-T |
| 454 | HongKong | Chinese-T |
| 455 | Macao | Chinese-T |
| 440, 441 | Japan | J (Kanji) |
| 450, 467 | Korea | K (Hanja) |
| 452 | Vietnam | V (Chunom) |

NOTE:

This is due to CJKV ideograph language ambiguity in UCS2, in the sense that the same hexadecimal code can be mapped to different character displays dependent on the used language. The coding of CJKV ideographs itself does not allow to discriminate the CJKV ideograph language.

a.b.c.d Network Name 2

The purpose of this information element is to pass a text string to the mobile station.

The Network Name 2 information element is coded as shown in figure x1.y2.z1/3GPP TS 24.008 and table x2.y2.z2/3GPP TS 24.008.

If the coding scheme UCS2 is used and Chinese-Japanese-Korean-Vietnamese (CJKV) ideographs as defined in ISO/IEC 10646 [72] are received in the text string, the MS shall use the language of the MMI to determine the language for those CJKV ideographs.

NOTE: This is due to CJKV ideograph language ambiguity in UCS2, in the sense that the same hexadecimal code can be mapped to different character displays dependent on the used language. The coding of CJKV ideographs itself does not allow to discriminate the CJKV ideograph language.

The Network Name 2 is a type 4 information element with a minimum length of 3 octets. No upper length limit is specified except for that given by the maximum number of octets in a L3 message (see 3GPP TS 44.006 [19]).

For the 3GPP TS 24.008 Network Name 2 information element see FIG. 8 of the present disclosure

TABLE 10

5.94/3GPP TS 24.008 Network Name 2 information element

Number of spare bits in last octet (octet 3, bits 3 to 5)

5 4 3

0 0 1 bit 8 is spare and set to "0" in octet n
0 1 0 bits 7 and 8 are spare and set to "0" in octet n
0 1 1 bits 6 to 8(inclusive) are spare and set to "0" in octet n
1 0 0 bits 5 to 8(inclusive) are spare and set to "0" in octet n
1 0 1 bits 4 to 8(inclusive) are spare and set to "0" in octet n
1 1 0 bits 3 to 8(inclusive) are spare and set to "0" in octet n
1 1 1 bits 2 to 8(inclusive) are spare and set to "0" in octet n
0 0 0 this field carries no information about the number of spare bits in octet n Coding Scheme (octet 3, bits 5-7)

0 0 0 Cell Broadcast data coding scheme, GSM default alphabet, language unspecified, defined in 3GPP TS 23.038 [8b]
0 0 1 UCS2 (16 bit) [72]
0 1 0
to reserved
1 1 1

Text String (octet 4 to octet n, inclusive)

Encoded according to the Coding Scheme defined by octet 3, bits 3-5

The invention claimed is:

1. A method at a user equipment, the method comprising:
receiving a string at the user equipment, the string comprising a plurality of indicia and an indicator bit;
based on the indicator bit, performing one of:
determining whether the user equipment supports one or more indicium of the plurality of indicia and skipping display of characters corresponding to non-supported indicia; or
displaying all indicium within the plurality of indicia.

2. The method of claim 1, wherein the string comprises a plurality of indicator bits, each indicator bit corresponding with an indicium in the plurality of indicia and indicating whether the indicium needs to be displayed or skipped.

3. The method of claim 1, wherein the string is received in at least one of an information element and a control signal.

4. The method of claim 3, wherein the string is received in at least one of Mobility Management (MM) Information message, General Packet Radio Service (GPRS) Mobility Management (GMM) Information message, Temporary Mobile Subscriber Identity (TMSI) REALLOCATION COMMAND message, IDENTITY REQUEST message, LOCATION UPDATING ACCEPT message, ATTACH ACCEPT message, Enhanced Packet Services (EPS) Mobility Management (EMM) Information message, GUTI REALLOCATION COMMAND message, AUTHENTICATION REQUEST message, SECURITY MODE COMMAND message, IDENTITY REQUEST message, DETACH ACCEPT message, DETACH REQUEST message, TRACKING AREA UPDATE ACCEPT message, TRACKING AREA UPDATE REJECT message, CONFIGURATION UPDATE COMMAND message, REGISTRATION ACCEPT message, DEREGISTRATION REQUEST message, REGISTRATION REJECT message, IDENTITY REQUEST message, and AUTHENTICATION REQUEST message.

5. The method of claim 1, wherein the indicator bit indicates to treat at least one of indicium in the plurality of indicia as belonging to a default character set language for the plurality of indicia.

6. The method of claim 5, wherein a plurality of indicator bits are received in the string, each corresponding to an indicium in the plurality of indicia.

7. The method of claim 5, wherein a single indicator bit is received in the string indicating that all indicium in the plurality of indicia should be treated as belonging to the default character set language.

8. The method of claim 5, wherein the at least one of the indicium is a non-alphabet character.

9. The method of claim 1, wherein the user equipment uses a language set in a man-machine interface on the user equipment and the indicator bit to determine which indicium to display at the user equipment.

10. The method of claim 1, wherein the plurality of indicia corresponds to a name of a public land mobile network the user equipment is connected to.

11. A user equipment comprising:
a processor; and
a communications subsystem, wherein the user equipment is configured to:
receive a string at the user equipment, the string comprising a plurality of indicia and an indicator bit;
based on the indicator bit, perform one of:
determine whether the user equipment supports one or more indicium of the plurality of indicia and skipping display of characters corresponding to non-supported indicia; or
display all indicium within the plurality of indicia.

12. The user equipment of claim 11, wherein the string comprises a plurality of indicator bits, each indicator bit corresponding with an indicium in the plurality of indicia and indicating whether the indicium needs to be displayed or skipped.

13. The user equipment of claim 11, wherein the string is received in at least one of an information element and a control signal.

14. The user equipment of claim 13, wherein the string is received in at least one of Mobility Management (MM) Information message, General Packet Radio Service (GPRS) Mobility Management (GMM) Information message, Temporary Mobile Subscriber Identity (TMSI) REALLOCA- TION COMMAND message, IDENTITY REQUEST message, LOCATION UPDATING ACCEPT message, ATTACH ACCEPT message, Enhanced Packet Services (EPS) Mobility Management (EMM) Information message, GUTI REALLOCATION COMMAND message, AUTHENTICATION REQUEST message, SECURITY MODE COMMAND message, IDENTITY REQUEST message, DETACH ACCEPT message, DETACH REQUEST message, TRACKING AREA UPDATE ACCEPT message, TRACKING AREA UPDATE REJECT message, CONFIGURATION UPDATE COMMAND message, REGISTRATION ACCEPT message, DEREGISTRATION REQUEST message, REGISTRATION REJECT message, IDENTITY REQUEST message, and AUTHENTICATION REQUEST message.

15. The user equipment of claim 11, wherein the indicator bit indicates to treat at least one of indicium in the plurality of indicia as belonging to a default character set language for the plurality of indicia.

16. The user equipment of claim 15, wherein a plurality of indicator bits are received in the string, each corresponding to an indicium in the plurality of indicia.

17. The user equipment of claim 15, wherein a single indicator bit is received in the string indicating that all indicium in the plurality of indicia should be treated as belonging to the default character set language.

18. The user equipment of claim 15, wherein the at least one of the indicium is a non-alphabet character.

19. The user equipment of claim 11, wherein the user equipment uses a language set in a man-machine interface on the user equipment and the indicator bit to determine which indicium to display at the user equipment.

20. The method of claim 11, wherein the plurality of indicia corresponds to a name of a public land mobile network the user equipment is connected to.

21. A non-transitory computer readable medium for storing instruction code, which, when executed by a processor of a user equipment, cause the user equipment to:
receive a string of at the user equipment, the string comprising a plurality of indicia and an indicator bit;
based on the indicator bit, perform one of:
determine whether the user equipment supports one or more indicium of the plurality of indicia and skipping display of characters corresponding to non-supported indicia; or
display all indicium within the plurality of indicia.

* * * * *